United States Patent
Myerberg et al.

(10) Patent No.: US 11,623,389 B2
(45) Date of Patent: Apr. 11, 2023

(54) MULTI-DIRECTIONAL BINDER JETTING ADDITIVE MANUFACTURING

(71) Applicant: Desktop Metal, Inc., Burlington, MA (US)

(72) Inventors: Jonah Myerberg, Lexington, MA (US); Ricardo Fulop, Lexington, MA (US); Brett Schuster, Hollis, NH (US); Emanuel Michael Sachs, Newton, MA (US); Paul A. Hoisington, Hanover, NH (US); Anastasios John Hart, Waban, MA (US); Keith Vaillancourt, Hudson, NH (US); Steven Garrant, Mont Vernon, NH (US); George Hudelson, Billerica, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/328,272

(22) PCT Filed: Apr. 20, 2018

(86) PCT No.: PCT/US2018/028683
§ 371 (c)(1),
(2) Date: Feb. 25, 2019

(87) PCT Pub. No.: WO2018/195502
PCT Pub. Date: Oct. 25, 2018

(65) Prior Publication Data
US 2021/0283693 A1    Sep. 16, 2021

Related U.S. Application Data

(60) Provisional application No. 62/488,461, filed on Apr. 21, 2017.

(51) Int. Cl.
*B22F 1/10* (2022.01)
*B22F 3/16* (2006.01)
(Continued)

(52) U.S. Cl.
CPC .............. *B29C 64/165* (2017.08); *B22F 1/10* (2022.01); *B22F 1/14* (2022.01); *B22F 3/003* (2013.01);
(Continued)

(58) Field of Classification Search
CPC .. B22F 1/10; B22F 10/14; B22F 10/85; B22F 12/00; B22F 12/63; B22F 12/52;
(Continued)

(56) References Cited

U.S. PATENT DOCUMENTS 6,238,614 B1 * 5/2001 Yang ...................... B33Y 10/00
264/497
10,780,497 B2 * 9/2020 Ng ......................... B29C 64/209
(Continued)

OTHER PUBLICATIONS

Gibson, Additive Manufacturing Technologies Rapid Prototyping to Direct Digital Manufacturing, Springer, 2010, (Year: 2010).*

*Primary Examiner* — Anthony J Zimmer
*Assistant Examiner* — Jacob J Gusewelle
(74) *Attorney, Agent, or Firm* — Oak Law, PLLC; Jonathan D. Hall

(57) ABSTRACT

The devices, systems, and methods of the present disclosure are directed to powder spreading and binder distribution techniques for consistent and rapid layer-by-layer fabrication of three-dimensional objects formed through binder jetting. For example, a powder may be spread to form a layer along a volume defined by a powder box, a binder may be deposited along the layer to form a layer of a three-dimensional object, and the direction of spreading the layer and depositing the binder may be in a first direction and in (Continued)

a second direction, different from the first direction, thus facilitating rapid formation of the three-dimensional object with each passage of the print carriage over the volume. Powder delivery, powder spreading, thermal energy delivery, and combinations thereof, may facilitate consistently achieving quality standards as the rate of fabrication of the three-dimensional object is increased.

13 Claims, 6 Drawing Sheets

(51) Int. Cl.

| | |
|---|---|
| B22F 3/18 | (2006.01) |
| B29C 64/165 | (2017.01) |
| B33Y 30/00 | (2015.01) |
| B33Y 10/00 | (2015.01) |
| B33Y 40/00 | (2020.01) |
| B22F 12/00 | (2021.01) |
| B33Y 50/02 | (2015.01) |
| B22F 10/14 | (2021.01) |
| B22F 10/85 | (2021.01) |
| B22F 12/63 | (2021.01) |
| B22F 12/52 | (2021.01) |
| B22F 1/14 | (2022.01) |
| B22F 3/00 | (2021.01) |
| B22F 12/41 | (2021.01) |
| B22F 12/47 | (2021.01) |
| B22F 12/55 | (2021.01) |
| B22F 10/10 | (2021.01) |
| B22F 12/45 | (2021.01) |
| B22F 12/57 | (2021.01) |
| B22F 10/34 | (2021.01) |

(52) U.S. Cl.
CPC .............. *B22F 3/004* (2013.01); *B22F 3/16* (2013.01); *B22F 3/18* (2013.01); *B22F 10/14* (2021.01); *B22F 10/85* (2021.01); *B22F 12/224* (2021.01); *B22F 12/41* (2021.01); *B22F 12/47* (2021.01); *B22F 12/52* (2021.01); *B22F 12/55* (2021.01); *B22F 12/63* (2021.01); *B33Y 10/00* (2014.12); *B33Y 30/00* (2014.12); *B33Y 40/00* (2014.12); *B33Y 50/02* (2014.12); *B22F 10/34* (2021.01); *B22F 12/45* (2021.01); *B22F 12/57* (2021.01); *B22F 2202/01* (2013.01); *B22F 2202/11* (2013.01); *B22F 2998/00* (2013.01); *B22F 2999/00* (2013.01)

(58) Field of Classification Search
CPC .. B22F 1/14; B22F 3/003; B22F 3/004; B22F 3/16; B22F 3/18; B22F 10/10; B22F 2202/01; B22F 2202/11; B22F 2998/00; B22F 2999/00; B33Y 10/00; B33Y 30/00; B33Y 50/02; B33Y 40/00; B29C 64/165
See application file for complete search history.

(56) References Cited

U.S. PATENT DOCUMENTS

| | | | |
|---|---|---|---|
| 2002/0195747 A1* | 12/2002 | Hull | B29C 64/124 |
| | | | 264/401 |
| 2011/0223349 A1* | 9/2011 | Scott | B29C 31/066 |
| | | | 427/532 |
| 2016/0193696 A1* | 7/2016 | McFarland | B23K 26/342 |
| | | | 219/76.12 |
| 2017/0326792 A1* | 11/2017 | Paternoster | B22F 12/00 |
| 2019/0126551 A1* | 5/2019 | Campderros Canas | B22F 3/00 |

* cited by examiner

MULTI-DIRECTIONAL BINDER JETTING ADDITIVE MANUFACTURING

CROSS-REFERENCE TO RELATED APPLICATIONS

This application claims priority to U.S. Provisional Patent Application No. 62/488,461, filed on Apr. 21, 2017, the entire contents of which are incorporated herein by reference.

BACKGROUND

Binder jetting is an additive manufacturing technique based on the use of a liquid binder to join particles of a powder to form a three-dimensional object. In particular, a controlled pattern of the liquid binder is applied to successive layers of the powder in a powder bed such that the layers of the powder adhere to one another form a three-dimensional object. The three-dimensional object is then densified into a finished part through subsequent processing, such as sintering.

The binder jetting fabrication process used to form the three-dimensional objects, however, can present certain challenges with respect to quality and throughput of finished parts formed from the three-dimensional objects. In particular, consistent layer-by-layer distribution of the powder and the liquid binder to form the three-dimensional object is important for achieving target quality of the finished part formed from the three-dimensional object. However, the time associated with consistent layer-by-layer distribution of the powder and the liquid binder can have an adverse impact on the commercial scale viability of binder jetting as an additive manufacturing technique to form finished parts. Thus, there generally remains a need for improving speed in the layer-by-layer distribution of the powder and liquid binder while maintaining or improving quality of three-dimensional objects formed using binder jetting techniques.

SUMMARY

The devices, systems, and methods of the present disclosure are directed to powder spreading and binder distribution techniques for consistent and rapid layer-by-layer fabrication of three-dimensional objects formed through binder jetting. For example, a powder may be spread to form a layer along a volume defined by a powder box, a binder may be deposited along the layer to form a layer of a three-dimensional object, and the direction of spreading the layer and depositing the binder may be in a first direction and in a second direction, different from the first direction, thus facilitating rapid formation of the three-dimensional object with each passage of the print carriage over the volume. Powder delivery, powder spreading, thermal energy delivery, and combinations thereof, may facilitate consistently achieving quality standards as the rate of fabrication of the three-dimensional object is increased.

According to one aspect, a method of additive manufacturing may include, along a volume defined by a powder box, spreading a layer of powder including metal particles, depositing a binder in a controlled two-dimensional pattern along the layer, and directing thermal energy to the layer, wherein the steps of spreading the layer, depositing the binder, and directing the thermal energy to the layer are performed in a first direction across the volume and repeated in a second direction, different from the first direction, across the volume to form alternating layers of a three-dimensional object. The second direction may be, for example, substantially opposite the first direction across the volume.

In certain implementations, directing thermal energy to the layer may include directing the thermal energy to the binder deposited along the layer. Additionally, or alternatively, directing thermal energy to the layer may include increasing at least a local temperature of the layer. For example, directing thermal energy to the layer may include drying at least a portion of the layer. Further, or instead, directing the thermal energy to the layer may include directing one or more of infrared energy or microwave energy to the layer.

In some implementations, directing thermal energy to the layer may include moving a thermal energy source across the layer, with movement of the thermal energy source indexed relative to spreading sequential layers of powder along the volume.

In certain implementations, depositing the binder may include ejecting the binder from at least one ejection orifice defined by a print carriage moving in the first direction and in the second direction.

In some implementations, in the first direction, spreading the layer of powder may include dispensing a first powder from a first hopper and, in the second direction, spreading the layer of powder includes dispensing a second powder from a second hopper, the second hopper different from the first hopper, and the second powder different from the first powder. For example, the first powder may include metal particles of a first metal and the second powder includes metal particles of a second metal, different from the first metal.

In certain implementations, the method may further include depositing an anti-sintering agent along the layer of powder along a portion of the layer outside of or along the controlled two-dimensional pattern.

According to another aspect, an additive manufacturing system may include a powder box defining a volume, at least one spreader movable over the volume to spread a layer of a powder across the volume, a print carriage defining at least one ejection orifice, the print carriage movable over the volume, and the print carriage actuatable to eject a binder from the at least one ejection orifice in a direction toward the layer as the print carriage moves over the volume, and at least one thermal energy source movable over the volume in coordination with movement of the at least one spreader over the volume, the at least one thermal energy source positioned to direct thermal energy toward the layer as the at least one thermal energy source moves over the volume.

In some implementations, the at least one thermal energy source may be movable over the volume in coordination with movement of the print carriage to trail the at least one ejection orifice across the volume. Additionally, or alternatively, the at least one thermal energy source may be movable over the volume at a substantially constant rate. Further, or instead, the at least one spreader, the print carriage, and the at least one thermal energy source may each be movable over the volume at substantially the same rate as one another. Still further, or instead, the at least one thermal energy source may include one or more of an infrared energy source or a microwave energy source.

In certain implementations, the at least one spreader may be movable over the volume in a first direction and in a second direction different from the first direction, and the at least one spreader is positionable relative to the volume to spread alternating layers of the powder through movement in the first direction and in the second direction. For example, the at least one spreader may include a first spreader and a second spreader, the first spreader disposed relative to the second spreader to precede the second spreader over the volume in the first direction, and the second spreader disposed relative to the first spreader to precede the first spreader over the volume in the first direction. Additionally, or alternatively, the at least one thermal energy source may include a first thermal energy source and a second thermal energy source, the first thermal energy source trailing the first spreader over the volume in the first direction, and the second thermal energy source trailing the second spreader over the volume in the second direction.

According to another aspect, an additive manufacturing system may include a print box, a print carriage, a spreader, and a hopper. The print box may define a volume, and the print carriage may be movable over the volume, the print carriage defining at least one ejection orifice directed toward the volume as the print carriage moves over the volume. The spreader may be movable over the volume in advance of the print carriage. The hopper may be movable over the volume in advance of the spreader, the hopper defining a dispensing region, the hopper including a plurality of dispensing rollers along the dispensing region, and the plurality of dispensing rollers rotatable relative to one another to move a powder through the dispensing region and toward the volume in advance of the spreader as the spreader moves toward a position over the volume to form a layer of the powder, onto which a binder is deliverable from the at least one ejection orifice of the print carriage trailing the spreader over the volume. Each dispensing roller of the plurality of dispensing rollers may have, for example, a substantially similar diameter.

In certain implementations, dispensing rollers of the plurality of dispensing rollers may be spaced apart from one another to define a gap, and the plurality of dispensing rollers are rotatable relative to one another to move the powder through the gap and toward the volume. The dispensing region of the hopper may span a dimension of the volume substantially parallel to the gap as the hopper moves over the volume. Additionally, or alternatively, the plurality of dispensing rollers may span the dimension of the volume as the hopper moves over the volume.

In some implementations, the additive manufacturing system may further include at least one motor mechanically coupled to one or more dispensing rollers of the plurality of dispensing rollers, the at least one motor actuatable to rotate the plurality of dispensing rollers relative to one another. The at least one motor may be, for example, actuatable to rotate the plurality of dispensing rollers in a counter-rotating direction relative to one another. In certain instances, the additive manufacturing system may further include a controller in electrical communication with the at least one motor, the controller configured to actuate the at least one motor based on movement of the hopper over the volume. The controller may be configured, for example, to actuate the at least one motor in a first direction of movement of the hopper over the volume and to pause actuation of the at least one motor in a second direction of movement of the hopper over the volume, the second direction of movement different from the first direction of movement. Further, or instead, the controller may be configured to actuate the at least one motor based on speed of movement of the hopper over the volume. Additionally, or alternatively, the controller may be configured to actuate the at least one motor to rotate the plurality of dispensing rollers at substantially the same rotation speed.

In certain implementations, the hopper may include a storage region in fluid communication with the dispensing region, the powder movable from the storage region toward the dispensing region through force of gravity as the hopper moves over the volume.

In some implementations, the hopper may include a shutter selectively movable between a first position away from the dispensing region to a second position below the dispensing region to interrupt movement of powder exiting the hopper via the dispensing region. The shutter may be, for example, selectively movable between the first position and the second position based on rotation of dispensing rollers of the plurality of dispensing rollers.

According to another aspect, a method of additive manufacturing of an object may include moving a hopper over a volume defined by a print box, as the hopper moves over the volume, rotating a plurality of dispensing rollers disposed along a dispensing region defined by the hopper, the rotation of the plurality of dispensing rollers moving a powder toward the volume from the dispensing region, spreading the powder along the volume to form a layer of the powder, and, in a controlled two-dimensional pattern, ejecting a binder from at least one ejection orifice of a print carriage to the layer of the powder to form a portion of the object.

In certain implementations, rotation of the plurality of dispensing rollers may move the powder toward the volume through a gap defined between the plurality of dispensing rollers. The gap and the dispensing region may span a dimension of the volume substantially perpendicular to a direction of movement of the hopper over the volume. Additionally, or alternatively, rotating the plurality of dispensing rollers may include counter-rotating dispensing rollers of the plurality of dispensing rollers. Further or instead, rotating the plurality of dispensing rollers may include controlling a rotation speed of at least one dispensing roller of the plurality of dispensing rollers based on a speed of movement of the hopper over the volume. Still further or instead, rotating the plurality of dispensing rollers may include controlling a rotation speed of at least one dispensing roller of the plurality of dispensing rollers based on position of the hopper over the volume. For example, controlling the rotation speed of the at least one dispensing roller may include reducing the rotation speed of the at least one dispensing roller as the hopper moves from a first side of the volume to a second side of the volume, the second side of the volume opposite the first side of the volume.

In some implementations, rotating the plurality of dispensing rollers may include rotating each dispensing roller of the plurality of dispensing rollers at substantially the same rotation speed.

In certain implementations, rotating the plurality of dispensing rollers may include controlling a rotation speed of each dispensing roller of the plurality of dispensing rollers based on a direction of movement of the hopper over the volume.

According to yet another aspect, a method of additive manufacturing may include moving at least one roller across a volume defined by a powder box, movement of the at least one roller across the volume spreading a layer of a powder across the volume, as the at least one roller spreads the layer across the volume, vibrating the at least one roller to pack the powder in the volume, and delivering a binder from a print carriage to the layer of the powder in a predetermined two-dimensional pattern associated with the layer as the print carriage moves over the volume. For example, vibrating the at least one roller may include vibrating the at least one roller at a frequency of greater than about 1 kHz or less than about 1 MHz.

In some implementations, moving the at least one roller across the volume may include rotating the at least one roller in a direction counter to a direction of movement of the at least one roller across the volume. Additionally, or alternatively, vibrating the at least one roller may include superimposing rotational vibration of the at least one roller onto the rotation of the at least one roller. Further or instead, vibrating the at least one roller may include vibrating the at least one roller in a direction substantially perpendicular to a direction of movement of the at least one roller across the volume.

In some implementations, the at least one roller may be coupled to springs, and vibrating the at least one roller includes delivering spring force to the at least one roller. Further, or instead, the at least one roller may be coupled to an eccentric motor, and vibrating the at least one roller includes controlling the eccentric motor to a predetermined rotation speed. Additionally, or alternatively, the at least one roller may be coupled to a voice coil actuator, and vibrating the at least one roller includes actuating the voice coil actuator at a predetermined frequency.

In certain implementations, the at least one roller may include a wall defining a roller volume, and vibrating the at least one roller includes pulsing pressurized fluid in the roller volume to expand the wall as the at least one roller moves across the powder box. The pressurized fluid may include one or more of a gas (e.g., air) or a liquid (e.g., water).

In some implementations, the at least one roller may include a piezoelectric coating on an outer surface of the at least one roller, and vibrating the at least one roller may include sending a pulsed electric signal to the piezoelectric coating as the at least one roller moves across the volume.

In certain implementations, the method may further include, for each respective layer of a plurality of layers, repeating the steps of moving the at least one roller across the volume, vibrating the at least one roller, and delivering the binder from the print carriage to the respective layer in a predetermined two-dimensional pattern associated with the respective layer to form a three-dimensional object. Additionally, or alternatively, one or more of the steps of moving the at least one roller across the volume, vibrating the at least one roller, and delivering the binder from the print carriage to the respective layer may be carried out in a first direction across the volume and in a second direction across the volume, and the first direction is different from the second direction.

According to yet another aspect, an additive manufacturing method may include moving at least one roller at a predetermined velocity across a volume defined by a powder box, movement of the at least one roller across the volume spreading a layer of a powder across the volume, vibrating the at least one roller at a predetermined frequency, the predetermined frequency corresponding to a wavelength substantially equal to an average size of particles of the powder as the at least one roller moves across the powder box at the predetermined velocity, and delivering a binder to the layer in a predetermined two-dimensional pattern corresponding to the layer. As an example, vibrating the at least one roller may include vibrating the at least one roller at a frequency of about 1 kHz to about 1 MHz.

In certain implementations, moving the at least one roller across the volume may include rotating the at least one roller in a direction counter to a direction of movement of the at least one roller across the volume. Further, or instead, vibrating the at least one roller may include superimposing rotational vibration of the at least one roller onto the rotation of the at least one roller. Additionally, or alternatively, vibrating the at least one roller may include vibrating the at least one roller in a direction substantially perpendicular to a direction of movement of the at least one roller across the volume.

In some implementations, the method may further include, for each respective layer of a plurality of layers, repeating the steps of moving the at least one roller, vibrating the at least one roller, and delivering the binder to the layer of the powder to form a three-dimensional object.

According to still another aspect, an additive manufacturing system may include a powder box, a print carriage, and at least one roller. The powder box may define a volume. The print carriage may define at least one ejection orifice, the print carriage movable over the volume, and the print carriage actuatable to eject a binder from the at least one ejection orifice in a direction toward a layer of a powder along the volume as the print carriage moves over the volume. The at least one roller may be movable over the volume in advance of the print carriage to spread the layer of the powder across the volume, the at least one roller actuatable to vibrate at a predetermined frequency as the at least one roller moves over the volume to transmit vibration from the at least one roller to the powder as the layer is spread across the volume. As an example, the at least one roller may be rotatable in a direction counter to a direction of movement of the at least one roller across the volume as the at least one roller moves across the volume. Additionally, or alternatively, the at least one roller is actuatable to vibrate as the at least one roller is rotated in the direction counter to the direction of movement of the at least one roller such that vibration of the at least one roller is superimposed on counter rotation of the at least one roller.

BRIEF DESCRIPTION OF THE DRAWINGS

The devices, systems, and methods described herein are set forth in the appended claims. However, for the purpose of explanation, several implementations are set forth in the following drawings:

DESCRIPTION

Figure 1A:
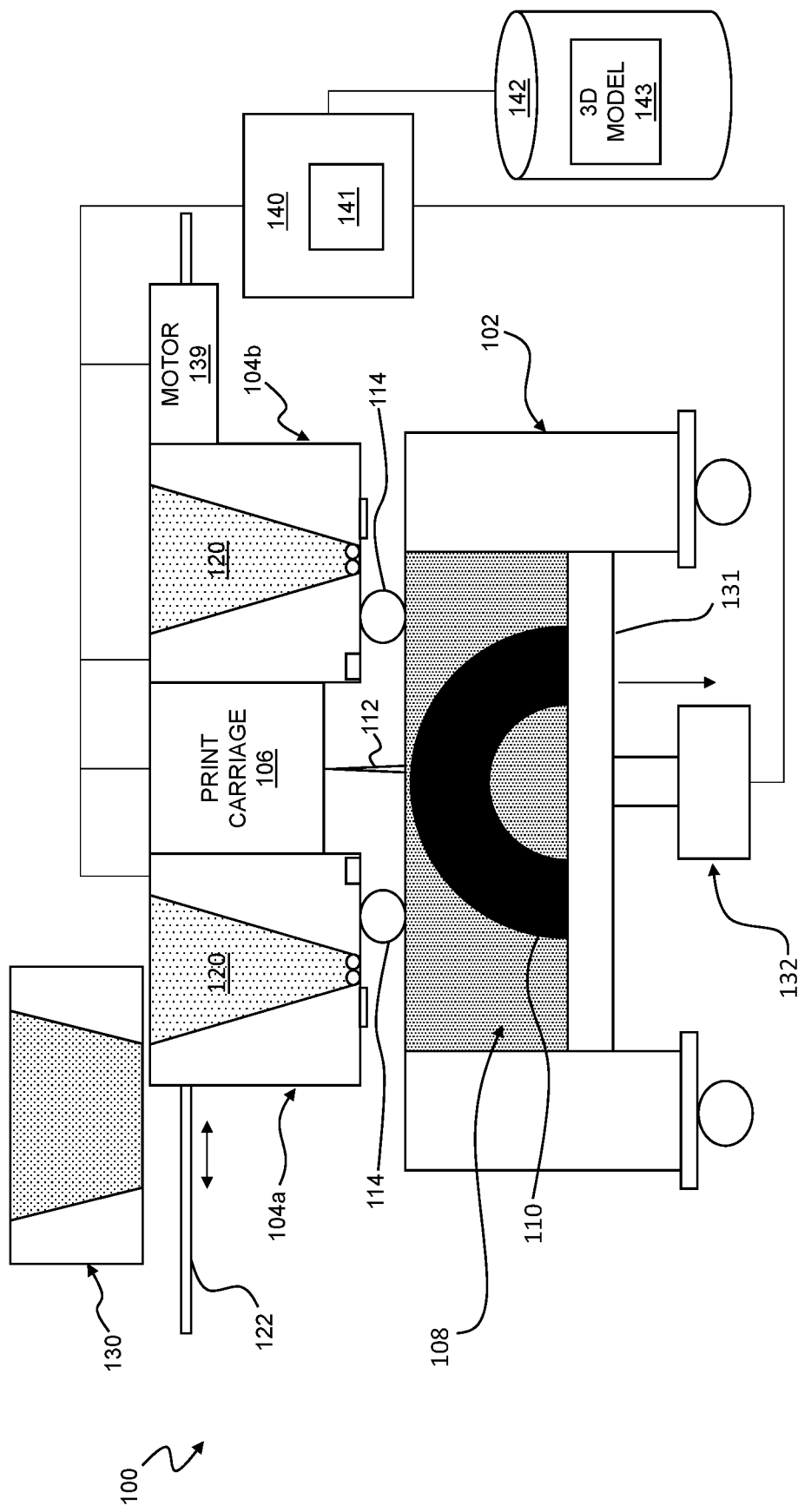
FIG. 1A is a schematic representation of an additive manufacturing system for forming a three-dimensional object.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the terms "or" and "and" should each generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

As used herein, the term two-dimensional slice should be understood to refer to a cross-sectional segment of a three-dimensional object, with the cross-sectional segment having a small thickness (e.g., greater than about 40 microns and less than about 150 microns) in a third dimension. That is, the thickness of the two-dimensional slice may be substantially smaller than either dimension of the cross-sectional segment in the other two dimensions. In general, two-dimensional slices may be formed on top of one another to form a three-dimensional object.

For the sake of clarity and completeness of explanation, the description that follows describes the use of devices, systems, and methods in the context of multi-directional binder jetting—that is, binder jetting fabrication techniques in which layers of powder are spread in at least two different directions in the course of fabricating a three-dimensional object and, additionally or alternatively, binder is applied to layers from a print carriage moving over a volume in at least two different directions. However, unless otherwise specified or made clear from the context, the description of devices, systems, and methods with respect to multi-directional binder jetting herein should not be understood to preclude the use of such devices, systems, and methods in the degenerate case of binder jetting along only a single direction. Thus, for example, while devices, systems, and methods for directing thermal energy, dispensing powder, and packing powder are described herein with respect to multi-directional binder jetting, such devices, systems, and methods should be understood to be beneficially applicable to single-direction binder jetting, unless otherwise indicated or made clear from the context.

Figure 1B:
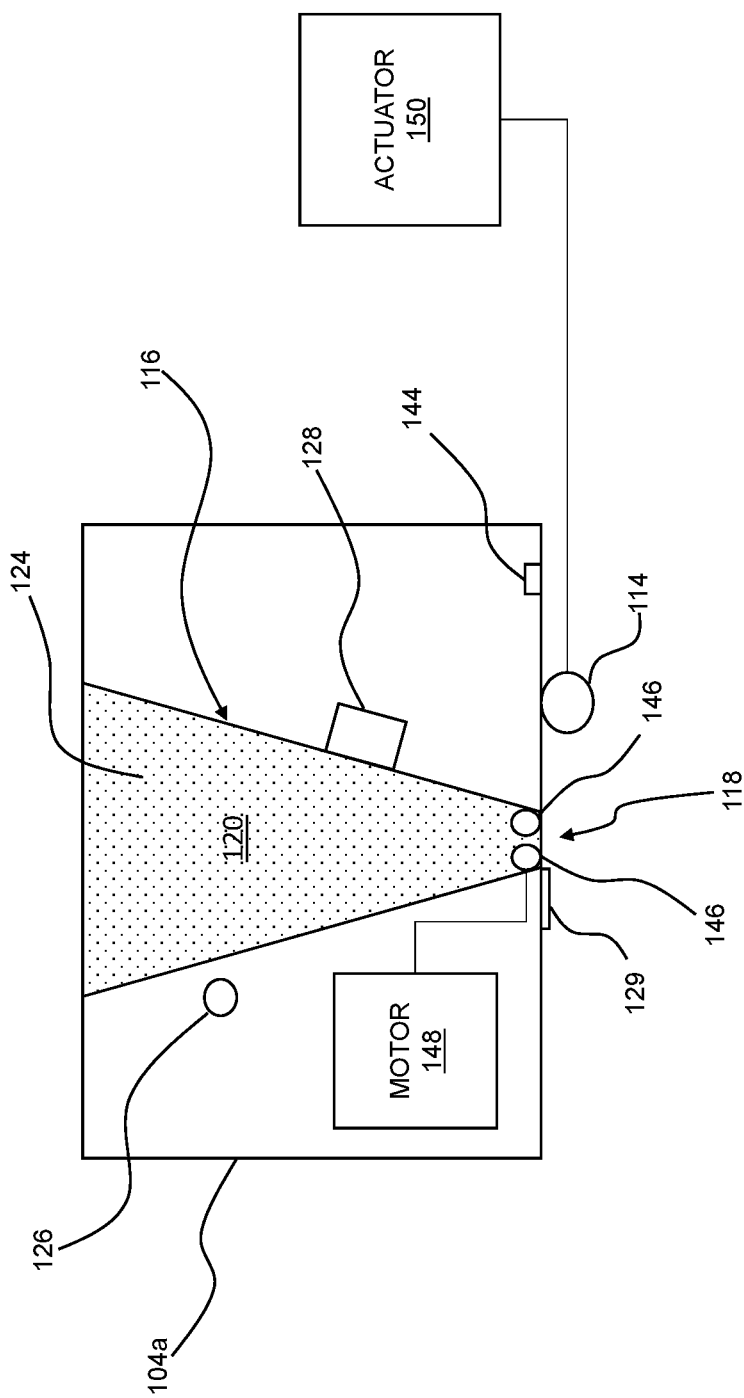
FIG. 1B is a schematic representation of a material carriage of the additive manufacturing system of FIG. 1A.
Figure 2:
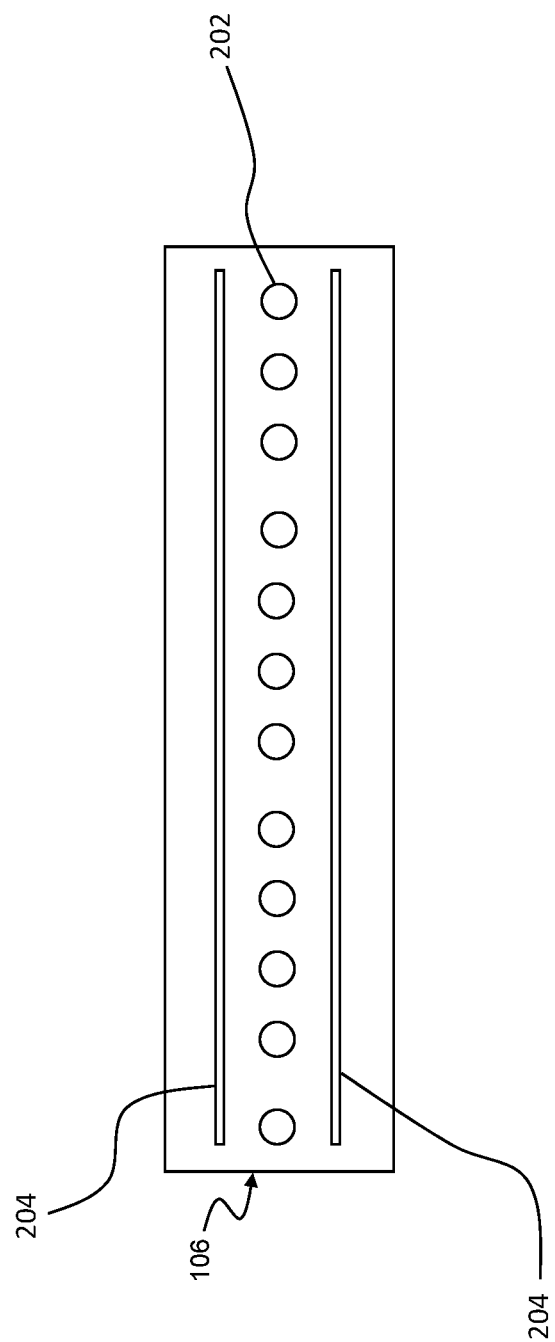
FIG. 2 is a bottom view of the print carriage of the additive manufacturing system of FIG. 1A.

Referring now to FIGS. 1A, 1B, and 2, an additive manufacturing system 100 may include a print box 102, a first material carriage 104a, a second material carriage 104b, and a print carriage 106. The print box 102 may define a volume 108 in which, as described in greater detail below, a three-dimensional object 110 may be formed by jetting a binder 112 (e.g., a polymeric binder) along layers of powder 120 (e.g., a powder including inorganic particles, such as metal particles, ceramic particles, or a combination thereof) spread in the volume 108. More specifically, each instance of the first material carriage 104a and the second material carriage 104b may include a respective instance of a spreader 114 and a respective instance of a hopper 116. Each instance of the spreader 114 may extend from the respective instance of the first material carriage 104a and the second material carriage 104b toward the volume 108 as the respective material carriage moves over the volume 108 and, further or instead, each instance of the hopper 116 may define a respective instance of a dispensing region 118 directed toward the volume 108 to dispense a quantity of a powder 120 to the volume 108. The print carriage 106 may define at least one ejection orifice 202 positioned to direct a fluid, such as the binder 112, toward the powder 120 in the volume 108. As described in greater detail below, the first material carriage 104a, the print carriage 106, and the second material carriage 104b may each be movable over the volume 108 to carry out multi-directional binder jetting fabrication according to any one or more of the methods described herein. In general, such multi-directional binder jetting carried out by the additive manufacturing system 100 may significantly increase the rate of fabrication of three-dimensional objects, as compared to binder jetting in only a single direction. As also described in greater detail below, the additive manufacturing system 100 may carry out any one or more of various different powder delivery, powder spreading, thermal energy delivery techniques described herein to address challenges associated with achieving quality standards of the three-dimensional object 110 as the rate of fabrication is increased through multi-directional printing.

In general, the spatial orientation of the first direction and the second direction of movement of the first material carriage 104a, the second material carriage 104b, and the print carriage 106 relative to one another may be any of various different combination of directions useful for achieving efficient movement of components as two-dimensional slices of the three-dimensional object 110 are formed in a layer-by-layer fabrication process. Thus, in a particularly useful implementation, the first direction and the second direction may be substantially opposite one another over the volume 108 such that the components move back and forth over the volume 108 as the three-dimensional object 110 is formed. As compared to other directions of movement, this type of back and forth movement may offer advantages associated with the rate of fabrication. Further, or instead, back and forth movement may reduce the complexity of controlling timing and position of the first material carriage 104a, the second material carriage 104b, and the print carriage 106 relative to one another and/or relative to the volume 108, with corresponding advantages being realized in accuracy of the three-dimensional object 110.

In certain implementations, the additive manufacturing system 100 may include one or more rails 122, which may be useful for controlling timing and positioning of one or more of the first material carriage 104a, the second material carriage 104b, or the print carriage 106 throughout multi-directional binder jetting to form the three-dimensional object 110. For example, the first material carriage 104a, the second material carriage 104b, the print carriage 106, or a combination thereof, may be bidirectionally movable along the one or more rails 122 to move back and forth over the volume 108. As the respective components undergo back and forth movement along the one or more rails 122, it should be appreciated that the shape and position of the one or more rails 122 relative to the volume 108 supports the first material carriage 104a, the second material carriage 104b, the print carriage 106, or a combination thereof, at one or more controlled distances relative to the volume 108. As a specific example, the one or more rails 122 may be substantially parallel to the volume 108 at least along a portion of the one or more rails 122 corresponding to travel of the first material carriage 104a, the second material carriage 104b, the print carriage 106, or a combination thereof, over the volume 108. In certain instances, the one or more rails 122 may be dimensioned to be substantially rigid in response to forces exerted on the one or more rails 122 through movement of the first material carriage 104a, the second material carriage 104b, the print carriage, or a combination thereof, along the one or more rails 122 such that the one or more controlled distances are substantially maintained throughout the movement of the respective components along the one or more rails 122. Additionally, or alternatively, in instances in which the first material carriage 104a, the second material carriage 104b, and the print carriage 106 are movable on the same one or more rails 122, the one or more rails 122 may advantageously provide a robust mechanism for maintaining the components in a fixed physical orientation relative to one another as the components move back and forth over the volume 108.

In general, the timing of the respective movements the first material carriage 104a, the second material carriage 104b, and the print carriage 106 may be controlled according to any of various different techniques suitable for achieving accurate and rapid formation of the three-dimensional object 110 through multi-directional binder jetting. Thus, in some implementations, one or more of the first material carriage 104a, the second material carriage 104b, and the print carriage 106 may be independently movable relative to one another over the volume 108 in the first direction and in the second direction. Such independent movement may be useful, for example, for reducing the likelihood of contaminating or otherwise degrading performance of the print carriage 106 through exposure to the powder 120 being dispensed from the first material carriage 104a in the first direction and from the second material carriage 104b in the second direction. As an example, one or more of the first material carriage 104a, the print carriage 106, and the second material carriage 104b may be movable over the volume 108 one at a time as the other components are disposed along one or more sides of the volume 108. Additionally, or alternatively, one or more of the first material carriage 104a, the second material carriage 104b, and the print carriage 106 may be mechanically coupled to at least another one of the first material carriage 104a, the second material carriage 104b, and the print carriage 106 to move as a single unit in the first direction and the second direction over the volume 108. That is, while the first material carriage 104a, the second material carriage 104b, and the print carriage 106 are described and depicted as separate components, any one or more of the features of the first material carriage 104a, the second material carriage 104b, and the print carriage 106 may be combined into a single unit. As compared to moving each component over the volume 108 one at a time, such a single unit may advantageously reduce delays and control complexity that may be associated with moving the first material carriage 104a, the second material carriage 104b, and the print carriage 106 bidirectionally across the volume 108.

In general, the first material carriage 104a and the second material carriage 104b may be substantially identical to one another, except that each is generally a mirror configuration of the other with respect to at least one plane extending through the print carriage 106. This symmetry of the first material carriage 104a and the second material carriage 104b may be particularly advantageous for achieving substantially similar layer characteristics in each direction of the binder jetting process carried out by the additive manufacturing system 100. In turn, such similar layer characteristics may facilitate forming the three-dimensional object 110 within target dimensional tolerances. That is, the three-dimensional object 110 may be formed substantially without defects associated with changing direction of the layer-by-layer fabrication process. Accordingly, for the sake of clarity and efficient description, the features of the first material carriage 104a are described below and, unless another intention is indicated, corresponding aspects of the second material carriage 104b shall be understood to be identical to those of the first material carriage 104a and are not described separately.

The hopper 116 may define a storage region 124 in fluid communication with the dispensing region 118 such that the powder 120 is movable (e.g., through the force of gravity, through the use of actuators, or a combination thereof) from the storage region 124 to the volume 108 via the dispensing region 118. The storage region 124 may store, for example, a quantity of the powder 120 sufficient for forming multiple layers of the three-dimensional object 110. As a competing consideration, however, the capacity of the storage region 124 may be limited by space and weight considerations associated with rapid movement of the hopper 116 in some applications.

To facilitate management of moisture in the quantity of the powder 120 stored in the storage region 124, each of the first material carriage 104a and the second material carriage 104b may include a heater 126 in thermal communication with the storage region 124 of the hopper 116. The heater 126 may be any of various different types of heaters known in the art and, thus, may include a resistance heater. In some instances, the heater 126 may be adjustable to maintain the powder 120 in the storage region 124 at a predetermined temperature, such as a predetermined temperature provided by an operator of the machine.

Additionally, or alternatively, to facilitate management of settling of the powder 120 stored in the storage region 124, each of the first material carriage 104a and the second material carriage 104b may include an agitator 128 in mechanical communication with the storage region 124 of the hopper 116. In general, the agitator 128 may vibrate walls of the storage region 124 at frequencies that are useful for reducing the likelihood of the powder 120 sticking to the walls of the storage region 124 while not interfering with overall movement of the hopper 116 across the volume 108. By way of example, the agitator 128 may include a piezoelectric element actuatable to vibrate the storage region 124.

The dispensing region 118 of the hopper 116 may span a width of the volume 108. As used in this context, the width of the volume 108 may include, for example, a dimension of the volume 108 substantially perpendicular to the first direction and the second direction as the dispensing region 118 moves back and forth over the volume 108 in the first direction and the second direction. With the dispensing region 118 spanning the width of the volume 108, the powder 120 may be dispensed along the entire width of the volume 108 as the hopper 116 moves over the volume 108. As compared to other patterns of distribution of the powder 120, distributing the powder 120 along the entire width of the volume 108 may facilitate achieving a substantially uniform distribution of the powder 120 as the hopper 116 moves rapidly over the volume 108.

The hopper 116 may include, in some instances, a shutter 129 movable between an open position (shown in FIGS. 1A and 1B) and a closed position. In the open position, the shutter 129 may be spaced away from the dispensing region 118 of the hopper 116 such that the powder 120 exiting the dispensing region 118 is substantially unobstructed by the shutter 129. In the closed position, the shutter 129 may slide over the dispensing region 118 to at least partially obstruct the dispensing region 118 of the hopper 116 to block the powder 120 from the hopper 116 from inadvertently falling out of the hopper 116. Thus, controlling the shutter 129 between the open position and the closed position may be useful for reducing errant distribution of the powder 120 and, thus, may facilitate accurately forming the three-dimensional object 110.

The shutter 129 may be in the open position as the hopper 116 of a given one of the first material carriage 104a and the second material carriage 104b moves in a leading position over the volume 108, thus permitting the powder 120 from the leading instance of the hopper 116 to be directed toward the volume 108. The shutter 129 may be in the closed position as the hopper 116 of a given one of the first material carriage 104a and the second material carriage 104b moves in a trailing position over the volume 108, thus blocking the powder 120 from the trailing instance of the hopper 116 to be blocked from falling onto the volume 108. Thus, as a specific example, the shutter 129 of the hopper 116 associated with the first material carriage 104a may be in the open position as the first material carriage 104a precedes the print carriage 106 over the volume 108 while the shutter 129 of the hopper 116 associated with the second material carriage 104b may be in the closed position as the second material carriage 104b trails the print carriage 106 over the volume 108. In the reverse direction, the positions of the respective instances of the shutter 129 may be reversed.

In certain implementations, as the shutter 129 is switched from the closed position to the open position, a small amount of the powder 120 may fall from the dispensing region 118 of the hopper 116 in a manner that may be uncontrolled or, further or instead, in a quantity that is unpredictable. Thus, to reduce the likelihood of this small amount of the powder 120 may interfere with accurately forming the three-dimensional object 110, the shutter 129 may be switched from the closed position to the open position along at a position in which the dispensing region 118 is lateral to the volume 108 such that the small amount of the powder 120 may be dumped prior to moving the dispensing region 118 over the volume 108 to dispense the powder 120 to be formed into a layer along a top portion of the volume 108.

In general, the shutter 129 may be moved between the open position and the closed position according to any one or more of various different mechanical and/or electrical actuating mechanisms. Thus, for example, the shutter 129 may slide between the open position and the closed position through an electrically controlled actuator (not shown). While the shutter 129 has been described as sliding between the open position and the closed position, it should be appreciated that other types of movement of the shutter 129 may be additionally or alternatively implemented to control the flow of the powder 120 from the dispensing region 118. For example, the shutter 129 may be pivotable about a hinge to move between the open and closed position.

In certain implementations, the additive manufacturing system 100 may include a bulk powder source 130, which may be useful for addressing certain challenges associated with moving the hopper 116 over the volume 108 as part of a multi-directional binder jetting process. For example, the bulk powder source 130 may be sized to contain enough powder sufficient to form one or more instances of the three-dimensional object 110. The hopper 116 may be positionable relative to the bulk powder source 130 to receive the powder 120 from the bulk powder source 130 (e.g., under the force of gravity). In certain instances, the hopper 116 may be refilled during the course of fabrication of the three-dimensional object 110, which may be particularly useful for forming the storage region 124 of the hopper 116 with a volume suitable for moving over the volume 108. That is, because the hopper 116 may be refilled, the storage region 124 may be formed with a relatively small volume such that the size and weight of the hopper may be suitable for rapid movement over the volume 108.

In general, the spreader 114 may be positioned on the respective instance of the first material carriage 104a and the second material carriage 104b such that the spreader 114 trails the dispensing region 118 of the hopper 116 as the dispensing region 118 precedes the at least one ejection orifice 202 of the print carriage 106 over the volume 108. Thus, as the powder 120 is dispensed from the dispensing region 118 of the hopper 116 to the volume 108, the spreader 114 may move over the volume 108 at a substantially fixed distance to spread the powder 120 into a layer. In turn, the binder 112 may be distributed from the at least one ejection orifice 202 onto the layer in a controlled two-dimensional pattern corresponding to a respective two-dimensional slice of the three-dimensional object 110.

In certain instances, a height of the spreader 114 above the volume 108 may be adjustable. For example, the height of the spreader 114 above the volume 108 may be adjustable to achieve a target layer height as the spreader 114 moves over the volume 108 in a direction in advance of the at least one ejection orifice 202 of the print carriage 106. Additionally, or alternatively, the height of the spreader 114 may be adjustable to move the spreader 114 away from the volume 108 as the spreader 114 moves over the volume 108 in a direction trailing the at least one ejection orifice 202 of the print carriage 106. Continuing with this example, such selective movement of the spreader 114 away from the volume 108 may be useful, for example, for reducing the likelihood of unintended contact between the spreader 114—in the trailing position—and the powder 120 which, in turn, may reduce the likelihood of introducing errors into the three-dimensional object 110 being formed.

The spreader 114 may generally include any manner and form of elongate element useful for spreading the powder 120 substantially uniformly across the volume 108 as the spreader 114 moves over the volume 108. Further, or instead, the spreader 114 may be a unitary body, such as may be useful for reducing the likelihood of forming debris as the spreader 114 spreads the powder 120 repeatedly over the course of forming multiple instances of the three-dimensional object 110. Thus, for example, the spreader 114 may be a roller. As used in the context of the spreader 114, a roller should be understood to include, for example, a substantially cylindrical shape actively and/or passively rotatable about the elongate axis of the cylindrical shape. For example, the roller may be driven to rotate in a direction substantially opposite a direction of travel of the spreader 114 over the volume 108. As used herein, movement of the roller in the direction substantially opposite the direction of travel of the spreader 114 should be understood to include rotation of the roller in a direction opposite to a direction of free rotation of the roller in the absence of the applied rotational force as the spreader 114 moves over the volume 108 with the roller in contact with the powder 120. As compared to passive rotation of the roller and/or active rotation of the roller in the direction of travel of the spreader 114, rotating the roller in the direction substantially opposite the direction of travel of the spreader 114 may produce a more even distribution of the powder 120 in the layer formed by the spreader 114.

In general, the print carriage 106 may be selectively actuatable (e.g., electrically actuatable) to produce a controlled distribution of the binder 112 in a two-dimensional pattern associated with the two-dimensional slice of the three-dimensional object 110 being formed. Given that the two-dimensional pattern may be different for different two-dimensional slices, the print carriage 106 may produce varying patterns of the binder 112 as required for the layer-by-layer fabrication of the three-dimensional object. These varying patterns may be produced according to any of various different techniques known in the art of ink jet printing. Thus, for example, the print carriage 106 may include at least one print bar. In turn, each print bar may include a plurality of print heads (e.g., piezoelectric print heads), and each print head may define at least one of the plurality of ejection orifices. Each print head may be independently controllable relative to each of the other print heads to facilitate accurate delivery of the binder according to a given controlled two-dimensional pattern associated with a two-dimensional slice being formed as the print carriage 106 moves across the volume 108.

The at least one ejection orifice 202 may be shaped and arranged according to any of various different patterns useful for producing a suitable distribution of the binder 112 in a controlled two-dimensional pattern along the layer. For example, the at least one ejection orifice 202 may include a plurality of instances of the at least one ejection orifice 202, and each instance of the at least one ejection orifice 202 may be substantially similar to each other instance of the at least one ejection orifice 202. Such similarity between instances of the at least one ejection orifice may be useful, for example, for producing uniform distributions of the binder 112. Further, or instead, the at least one ejection orifice 202 may include a plurality of orifices spaced relative to one another to span one or more dimensions along the top of the volume 108, with such spatial distribution contributing advantageously to uniformity of binder distribution. As an example, the at least one ejection orifice 202 may include a plurality of orifices spaced relative to one another along a direction substantially perpendicular to an axis defined by back and forth movement of print carriage 106 over the volume 108 in a first direction and a second direction opposite one another.

In certain implementations, the print carriage 106 may be advantageously formed to have substantially similar performance in the different directions of movement associated with a multi-directional binder jetting process. As an example, the at least one ejection orifice 202 may be directed relative to the volume 108 to eject the binder 112 in a direction substantially perpendicular to the volume 108 as the print carriage moves over the volume 108. This orientation of the at least one ejection orifice 202 may be useful, for example, for jetting the binder 112 in a manner that is substantially independent of the direction of movement of the print carriage 106 as the binder 112 is jetted toward the volume 108. In turn, eliminating or at least reducing directional artifacts associated with directing the binder 112 toward the volume 108 may result in improvements in accuracy of the three-dimensional object 110 being formed.

The print carriage 106 may, in certain instances, define a plurality of gas assist orifices 204 positioned relative to the at least one ejection orifice 202 to limit the impact of errant material on the formation of the three-dimensional object 110. For example, the gas assist orifices 204 may be disposed on either side of a plane bisecting the at least one ejection orifice 202. That is, the gas assist orifices 204 may be positioned to precede and trail the at least one ejection orifice 202 as the print carriage 106 moves across the volume 108 in a first direction and in a second direction different from the first direction. A gas (e.g., air) may be expelled through the plurality of gas assist orifices 204 as the binder 112 is ejected from the at least one ejection orifice 202. Expelling gas through the plurality of gas assist orifices 204 in this way may be useful, for example, for reducing the presence of fine powder particles, satellite droplets of the binder 112, or both, above the volume 108. Additionally, or alternatively, gas may be suctioned through the plurality of gas assist orifices 204 as the binder 112 is ejected from the at least one ejection orifice 202. Such suction may, in certain instances, be useful for reducing the presence of satellite droplets of the binder 112, fine particles, or both, floating above the volume 108. In general, reducing satellite droplets of the binder 112, fine powder particles, or both, above the volume may reduce the likelihood of such material interfering with the placement of the binder 112 in a controlled two-dimensional pattern on a layer of the powder 120 and, thus, may facilitate more accurate formation of the three-dimensional object 110.

In certain implementations, the additive manufacturing system 100 may include a z-stage actuator 132, which may be mechanically coupled (e.g., directly mechanically coupled) to a bottom surface 131 of the print box 102. Through actuation of the z-stage actuator 132, the bottom surface 131 of the print box 102 may be moved in a direction away from the print carriage 106 to increase a depth dimension of the volume 108 as the three-dimensional object 110 is formed in the volume 108. In general, the z-stage actuator 132 may be any of various different types of known mechanical actuators useful for precisely controlled vertical translation. For example, the z-stage actuator 132 may be moveable to move the bottom surface 131 of the print box 102 by a distance of about the thickness of each layer (e.g., about 40 microns to about 150 microns) with each pass of the print carriage 106 over the volume 108.

The z-stage actuator 132 may be, for example, releasably coupled to the print box 102. For example, the z-stage actuator 132 may be decoupled from the print box 102 to facilitate removal of the print box 102 from the additive manufacturing system 100 once the three-dimensional object 110 has been formed in the volume. For example, the print box 102 may be supported on a cart or other similar structure including a plurality of wheels. Continuing with this example, upon decoupling the print box 102 from the z-stage actuator 132, the cart may be rolled to move the print box 102 to one or more post-processing stations, where excess powder may be removed from the three-dimensional object 110 and/or the three-dimensional object 110 may undergo densification into a final part. It should be appreciated that the use of a cart or other similar wheeled structure may facilitate, for example, rapidly replacing the print box 102 as part of a process for rapidly fabricating multiple instances of the three-dimensional object 110.

The additive manufacturing system 100 may include at least one motor 139 coupled to one or more of the first material carriage 104a, the second material carriage 104b, and the print carriage 106 to move each respective component over the volume 108 in the first direction and the second direction. For example, in instances in which the first material carriage 104a, the second material carriage 104b, and the print carriage 106 are bidirectionally movable over the volume 108 along one or more rails 122, the at least one motor 139 may include a linear actuator, which may be particularly useful for precisely controlling position of the respective components. More generally, however, the at least one motor 139 may be any of various different types of motors electrically controllable to move the first material carriage 104a, the second material carriage 104b, and the print carriage 106 to carry out any one or more of the various different techniques described herein.

The additive manufacturing system 100 may include a controller 140. The controller may be in electrical communication with one or more of the at least one motor 139, the first material carriage 104a, the second material carriage 104b, and the print carriage 106, the z-stage actuator 132, and the at least one motor 139. The controller 140 may include one or more processors 141 operable to control the at least one motor 139, the first material carriage 104a, the second material carriage 104b, and the print carriage 106 to form the three-dimensional object 110.

The additive manufacturing system 100 may, additionally or alternatively, include a non-transitory, computer readable storage medium 142 in communication with the controller 140 and having stored thereon a three-dimensional model 143 and instructions for causing the one or more processors 141 to carry out any one or more of the methods described herein. In certain implementations, the controller 140 may retrieve the three-dimensional model 143 in response to user input and generate machine-ready instructions for execution by the additive manufacturing system 100 to fabricate the three-dimensional object 110.

In use, as the first material carriage 104a moves over the volume 108, a quantity of the powder 120 may be dispensed from the dispensing region 118 of the first material carriage 104a toward the volume 108 (e.g., directly onto the volume 108 or toward an area immediately adjacent to the volume 108). The spreader 114 of the first material carriage 104a may spread the dispensed quantity of the powder 120 to form a layer along the top of the volume 108 as the first material carriage 104a moves over the volume 108. The print carriage 106 may follow the first material carriage 104a in the first direction, and the binder 112 may be ejected from the at least one ejection orifice 202 of the print carriage 106 toward the layer in a controlled two-dimensional pattern corresponding to a respective two-dimensional slice of the three-dimensional object 110 being formed. Along the controlled two-dimensional pattern, the binder 112 may generally adhere the particles of the powder and to one or more adjacent layers. The second material carriage 104b may follow the print carriage 106 in the first direction and, in this trailing position, the spreader 114 of the second material carriage 104b may be in a raised position, out of contact with the layer, to reduce the likelihood of distorting the controlled two-dimensional pattern of the binder 112 in the layer.

Continuing with this example, the order of movement of the second material carriage 104b, the print carriage 106, and the first material carriage 104a may then be reversed to form a second layer. More specifically, the second material carriage 104b may move across the volume 108 in a second direction different from the first direction, and a quantity of the powder 120 may be dispensed from the dispensing region 118 of the second material carriage 104b toward the volume 108 (e.g., onto the volume 108 or to an area immediately adjacent to the volume 108). The spreader 114 of the second material carriage 104b, in a lowered position, may spread the powder 120 along the volume 108 to form the second layer of the powder 120. As the print carriage 106 follows the second material carriage 104b across the volume 108, the print carriage 106 may eject the binder 112 toward the layer in a controlled two-dimensional pattern corresponding to a respective two-dimensional slice of the three-dimensional object 110 being formed. Along the controlled two-dimensional pattern, the binder 112 may adhere the particles of the powder 120 to each other and to at least one other adjacent layer. The first material carriage 104a may follow the print carriage in the second direction, with the spreader 114 of the first material carriage 104a in a raised position above the volume 108 to reduce the likelihood of interfering with the layer formed by the second material carriage 104b. Thus, movement of the first material carriage 104a, the print carriage 106, and the second material carriage 104b across the volume 108 may be alternated in two different directions to form two-dimensional slices of the three-dimensional object 110 in each direction of travel. With less wasted motion, as compared to a single-direction approach requiring repositioning of components between formation of each slice, the additive manufacturing system 100 may significantly reduce the rate of fabrication of the three-dimensional object 110.

In general, increases in fabrication rate associated with binder jetting processes—whether multi-direction or single-direction—may be in tension with quality and accuracy goals associated with the fabrication process. That is, as the rate of fabrication increases, challenges associated with one or more of binder placement, powder dispensing, and spreading may become more pronounced. Accordingly, in the disclosure that follows, certain techniques are described for maintaining accuracy as fabrication rates are increased. More specifically, these techniques are related to thermal energy delivery, powder dispensing, and powder packing to reduce or eliminate certain sources of inaccuracy that may become more significant as fabrication rates increase. Unless otherwise specified or made clear from the context, these techniques should be understood to be equally applicable to single-direction binder jetting and multi-directional binder jetting.

Thermal Energy Delivery

In some implementations, the additive manufacturing system 100 may include at least one instance of a thermal energy source 144 movable the volume 108 in coordination with movement of the spreader 114 over the volume. In general, as the thermal energy source 144 moves over the volume 108, the thermal energy source 144 may be positioned to direct thermal energy toward the volume 108. The thermal energy may be directed through the space between the thermal energy source 144 and a layer on top of the volume 108 according to any manner and form of heat transfer (e.g., convection, conduction, radiation, or a combination thereof), unless otherwise specified or made clear from the context. Thus, for example, the thermal energy source 144 may be an infrared energy source, a microwave energy source, or a combination thereof.

The first material carriage 104a and the second material carriage 104b may each include a respective instance of the thermal energy source 144 such that the thermal energy source 144 is in a substantially fixed orientation relative to the spreader 114 of the respective material carriage. In general, the thermal energy source 144 may precede or trail the spreader 114 over the volume 108, depending on whether application of thermal energy to the volume 108 is intended to occur before or after spreading occurs. Similarly, the thermal energy source 144 may precede or trail the at least one ejection orifice 202 of the print carriage 106 over the volume 108, depending on whether application of thermal energy to a given layer on top of the volume 108 is intended to occur before or after the binder 112 has been delivered to the given layer. For example, in some instances, the thermal energy source 144 may be positioned such that thermal energy is directed to the layer of the powder 120 on top of the volume 108 after the binder 112 has been applied in a controlled two-dimensional pattern and before a subsequent layer of the powder 120 is spread across the volume 108. Timing the application of the thermal energy in this way may accelerate drying of the binder 112 which, in turn, may reduce the likelihood of smearing or otherwise distorting the controlled two-dimensional pattern of the binder 112 in a given layer on top of the volume 108 as a subsequent layer is formed in a rapid fabrication process. As a specific example, a first instance of the thermal energy source 144 may trail the instance of the spreader 114 of the first material carriage 104a over the volume 108 in a first direction, and a second instance of the thermal energy source 144 may trail the instance of the spreader 114 of the second material carriage 104b over the volume 108 in a second direction opposite the first direction. In this configuration, the second instance of the thermal energy source 144 may direct thermal energy toward the volume 108 as the second material carriage 104b moves in the first direction, trailing the print carriage 106. Similarly, the first instance of the thermal energy source 144 may direct thermal energy toward the volume 108 as the first material carriage 104a moves in the second direction, trailing the print carriage 106.

In general, the effectiveness of the thermal energy source 144 in delivering thermal energy to the volume 108 may be a function of the rate of movement of the thermal energy source 144 over the volume 108. That is, for a given rate of thermal energy production, slower speeds of movement of the thermal energy source 144 over the volume 108 may result in more effective heat transfer to the layer on top of the volume 108. Thus, in some instances, the thermal energy source 144 may be adjustable to produce more thermal power as the speed of the thermal energy source 144 increases over the volume 108. Additionally, or alternatively, the thermal energy source 144 may be moved over the volume 108 at a substantially constant rate, which may facilitate transferring a predictable and consistent amount of thermal energy to the layer on top of the volume 108. Further, or instead, the spreader 114, the print carriage 106, and the thermal energy source 144 may each be movable over the volume 108 at substantially the same rate as one another, which may be useful for coordinating heat transfer with the other processes associated with formation of the three-dimensional object 110.

Figure 3:
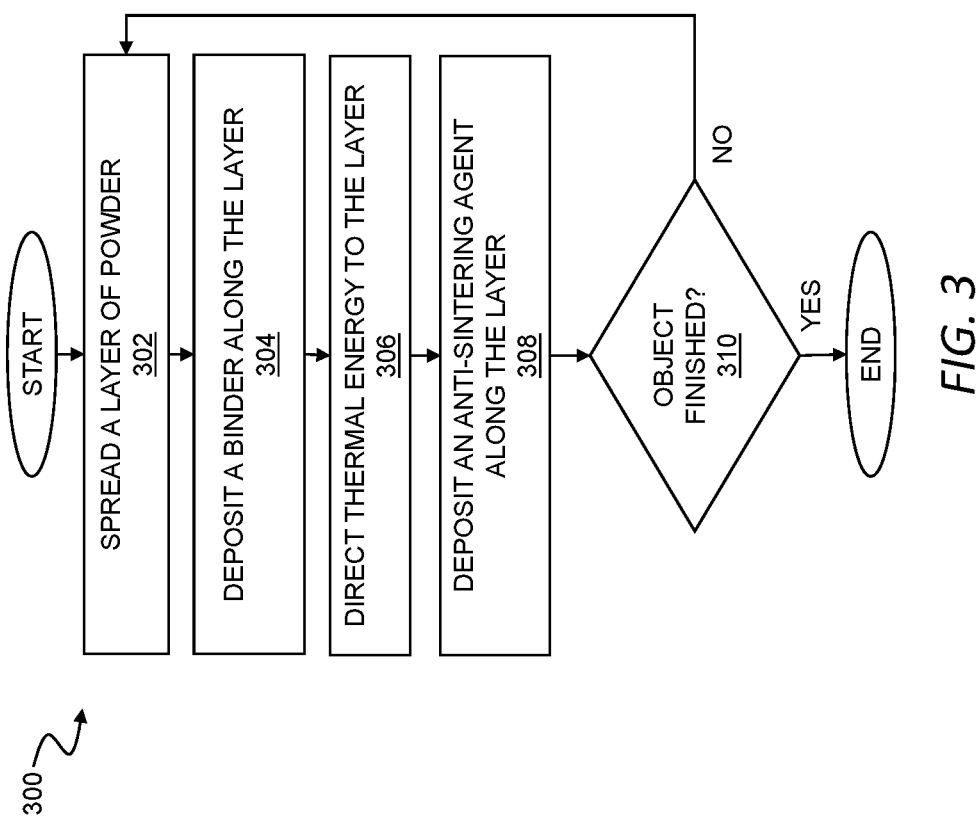
FIG. 3 is a flowchart of an exemplary method of thermal energy delivery for additive manufacturing.

FIG. 3 is a flowchart of an exemplary method 300 of thermal energy delivery in multi-directional additive manufacturing. In general, unless otherwise specified or made clear from the context, the exemplary method 300 may be carried out using any one or more of the additive manufacturing systems described herein. Thus, for example, one or more steps of the exemplary method 300 may be carried out by the additive manufacturing system 100 (FIG. 1A).

As shown in step 302, the exemplary method 300 may include spreading a layer of powder across a volume defined by a print box. The powder may be any one or more of the powders described herein and, thus, may include metal particles having a composition suitable for forming a finished part according to predetermined material specifications. For example, the metal particles may include one or more components of stainless steel such that, through densification and/or other post-processing, a finished part of stainless steel is formed. Still further or instead, spreading the layer of powder may include spreading according to any one or more of the spreading techniques described herein. As an example, spreading the layer of powder may include rolling the powder to form a substantially uniform layer across the volume.

As shown in step 304, the exemplary method 300 may include depositing a binder in a controlled two-dimensional pattern along the layer. The binder may be any one or more binders known in the art and suitable for adhering the metal particles of the powder to one another and to adjacent layers to hold the shape of the three-dimensional object being formed as a green part in the volume. The binder may be removable from the three-dimensional object through subsequent processing, such as processing to densify the three-dimensional object in instances in which densification of the three-dimensional object is desirable. Unless otherwise specified or made clear from the context, depositing the binder in the controlled two-dimensional pattern along the layer may be achieved using any one or more of the techniques. Thus, more specifically, the binder may be deposited along the layer through ejection from a print carriage moving over the volume (e.g., the print carriage 106 in FIG. 1A).

As shown in step 306, the exemplary method may include directing thermal energy to the layer. Directing thermal energy to the layer may include increasing at least a local temperature of the layer and, in some instances, may include substantially uniformly increasing the temperature of the layer. Further, or instead, directing thermal energy to the layer may include directing thermal energy to the layer to dry at least a portion of the layer. As used in this context, drying should be understood to include evaporating at least one liquid from at least a portion of the layer. As an example, the thermal energy may be applied to the layer (e.g., substantially uniformly) to remove water content that may be present in the layer. Additionally, or alternatively, the thermal energy may be directed to portions of the layer on which the binder is deposited. Directing thermal energy to the binder in the layer may, for example, accelerate drying the binder, which may reduce the likelihood of deformation of the pattern of the binder as a subsequent layer of powder is formed on top of the binder as part of a layer-by-layer fabrication process. More generally, directing thermal energy to the binder may be useful for changing one or more physicochemical properties of the binder. As used in this context, a change in physicochemical properties of the binder may include, for example, a change useful for forming the three-dimensional object as a stronger green part and/or for improving quality of the final part formed from the three-dimensional object.

In certain instances, directing thermal energy to the layer includes directing thermal energy to the layer from a thermal energy source moving over the layer. The movement of the thermal energy source over the layer may be indexed relative to spreading a subsequent, sequential layer along the volume such that the thermal energy is directed to the layer before the subsequent, sequential layer is formed on top of the layer. The thermal energy source may be any one or more of the thermal energy sources described herein and, thus, may include any one or more of an infrared energy source (to direct infrared energy to the layer) or a microwave energy source (to direct microwave energy to the layer).

As shown in step 308, the exemplary method 300 may include depositing an anti-sintering agent along the layer. In certain instances, the anti-sintering agent may be deposited along the layer by a print carriage moving over the layer. That is, a print carriage, such as the print carriage 106, may deliver the anti-sintering agent and the binder (e.g., through different ejection orifices) as the print carriage moves over the layer. As used in this context, an anti-sintering agent should be understood to include a material that is less sinterable than at least a portion of the metal particles of the powder. By way of example, the anti-sintering agent may be used to introduce certain structural characteristics into a final part formed from the three-dimensional object. Such structural characteristics may include an area of weakness useful for separating portions of the final part from one another.

As shown in step 310, the exemplary method 300 may include repeating one or more of the steps of spreading the layer (step 302), depositing the binder (step 304), directing the thermal energy to the layer (step 306), or depositing the anti-sintering agent along the layer (step 308) until the three-dimensional object is complete. More specifically, the exemplary method may include performing one or more of the steps of spreading the layer (step 302), depositing the binder (step 304), directing thermal energy to the layer (306), or depositing the anti-sintering agent along the layer (step 308) in a first direction across the volume and repeating the respective steps in a second direction, different from the first direction, across the volume to form alternating layers of a three-dimensional object. Unless otherwise specified or made clear from the context, these steps may be repeated in the first direction and the second direction using the multi-directional movement of hardware according to any one or more of the techniques described herein. For example, depositing the binder may include ejecting the binder from at least one ejection orifice defined by a print carriage moving in the first direction and in the second direction, as described herein. Further, or instead, the second direction may be, for example, substantially opposite the first direction across the volume such that the steps are generally performed through back-and-forth movement of hardware, as described herein.

Powder Dispensing

Referring again to FIGS. 1A, 1B, and 2, in some implementations, the hopper 116 may include a plurality of dispensing rollers 146 along the dispensing region 118. The dispensing rollers 146 may be spaced apart from one another to define a gap. Each dispensing roller 146 may be substantially cylindrical, which may be useful for defining the gap with a constant width. In general, the dispensing rollers 146 may rotate relative to one another to meter and direct the powder 120 through the gap and toward the volume 108 in advance of movement of the spreader 114 over the volume 108. Continuing with this example, the spreader 114 may move over the powder 120 to form a substantially uniform layer of the powder along the top of the volume 108, and the binder 112 may be delivered onto this layer from the at least one ejection orifice 202 of the print carriage 106 as the print carriage trails the spreader 114 over the volume 108. This process may be performed in different directions as necessary to carry out any one or more of the multi-directional binder jetting techniques described herein. Thus, in general, the dispensing rollers 146 may be useful for addressing the challenge of accurately dispensing the powder 120 in front of the spreader 114 as the hopper 116 and the spreader 114 move across the volume 108 as part of a rapid binder jetting process and, more specifically, a multi-directional binder jetting process.

In certain implementations, the dispensing region 118 may span a dimension of the volume substantially parallel to the gap defined by the plurality of dispensing rollers 146 as the hopper 116 moves over the volume 108. Continuing with this example, the plurality of dispensing rollers 146 may span this dimension of the volume 108 as the hopper 116 moves over the volume 108 such that the powder 120 may be substantially evenly distributed along the dimension. Such a substantially even distribution may, in turn, facilitate forming a substantially even thickness of the layer formed as the spreader 114 pushes the distributed powder 120 along the volume 108. As should be appreciated, improved control of layer formation may manifest as improved dimensional accuracy of the three-dimensional object 110 and, ultimately, as improved quality of a final part formed from the three-dimensional object 110.

In certain implementations, the plurality of dispensing rollers 146 may be substantially identical to one another, which may be useful for facilitating consistent and even distribution of the powder 120. Thus, for example, each dispensing roller 146 have a substantially similar diameter. With such similar diameters, rotating each dispensing roller 146 at the same rate may direct the powder 120 in a direction substantially perpendicular to a plane defined by a top of the volume 108. This may be useful, for example, for reducing the likelihood of producing errant particles that may interfere with other aspects for formation of the three-dimensional object. Further, or instead, each dispensing roller 146 may have the same surface finish, which may be useful for increasing the likelihood that the dispensing rollers 146 may wear at substantially the same rate.

In certain implementations, the hopper 116 may include at least one rotational motor 148 coupled to one or more of the dispensing rollers 146 and actuatable to rotate the plurality of dispensing rollers 146 relative to one another. The at least one rotational motor 148 may be any of various different known types of motors arranged for providing rotational motion transmittable to the dispensing rollers 146. Thus, for example, the at least one rotational motor 148 may include a rotary actuator.

In certain instances, the at least one rotational motor 148 may be coupled to the plurality of dispensing rollers 146 such that the at least one rotational motor 148 is actuatable to rotate the plurality of dispensing rollers 146 in a counter-rotating direction relative to one another. In one direction, the counter-rotation may be useful for imparting a force to the powder 120 in the gap to expel the powder 120 from the dispensing region 118. Continuing with this example, each instance of the dispensing roller 146 may be counter-rotated at substantially the same rotation speed (albeit in different directions), which may be useful for directing the powder 120 in a direction substantially perpendicular to a plane defined by the top of the volume 108. In another direction of counter-rotation, the counter-rotation may be useful for reducing inadvertent movement of the powder 120 through the gap.

The at least one rotational motor 148 may be in electrical communication with the controller 140 to control speed and direction of rotation of the at least one rotational motor 148 and, in turn, to control speed and direction of rotation of the plurality of dispensing rollers 146. That is, in general, rotation of the plurality of dispensing rollers 146 may be coordinated with one or more other aspects of the additive manufacturing system 100. For example, rotation of the plurality of dispensing rollers 146 may be adjusted in response to one or more changes in parameters associated with the additive manufacturing system 100, with such adjustments being useful for maintaining an advantageous distribution of the powder 120 throughout varying conditions that may be encountered as the three-dimensional object 110 is formed. For example, the controller 140 may be configured to actuate the at least one rotational motor 148 based on movement of the hopper 116 over the volume 108. Continuing with this example, the controller 140 may deactivate the at least one rotational motor 148 when the hopper 116 is not over the volume 108. Such selective actuation of the at least one rotational motor 148 may reduce the likelihood of inadvertently dispensing the powder 120 away from the volume 108 which, in turn, may reduce formation of errant particles of the powder 120. Additionally, or alternatively, the controller may be configured to actuate the at least one rotational motor 148 in a first direction of movement of the hopper 116 over the volume 108 and to pause actuation of the at least one rotational motor 148 in a second direction of movement of the hopper 116 over the volume, with the second direction being different from (e.g., opposite) the first direction.

In certain implementations, the controller 140 may be configured to actuate the at least one motor based on speed of movement of the hopper 116 over the volume 108. Such a variation in speed may be useful, for example, for driving the plurality of dispensing rollers 146 to control a rate of ejection of the powder 120 through the gap. Thus, for example, as the hopper 116 moves over the volume 108 at a higher rate of speed, the controller 140 may adjust actuation of the at least one rotational motor 148 to increase the angular speed of the plurality of dispensing rollers 146. In turn, this increase in angular speed may produce an increase in the amount of powder 120 ejected from the dispensing region 118. Thus, continuing with this example, the amount of powder 120 dispersed in front of the spreader 114 may be adjusted to keep pace with increases or decreases in speed of movement of the spreader 114 over the volume 108.

In some instances, the position of the shutter 129 with respect to the dispensing region 118 may be controlled based at least in part on rotation of the plurality of the dispensing rollers 146. For example, shutter 129 may be selectively movable between a first (open) position away from the dispensing region 118 to a second (closed) position below the dispensing region 118 (to interrupt movement of powder exiting the hopper 116 via the dispensing region 118), with such movement based at least in part on rotation of the plurality of dispensing rollers 146. That is, as the at least one rotational motor 148 is deactivated to cease rotation of the plurality of dispensing rollers 146, the shutter 129 may move to the closed position to interrupt movement of the powder 120 through the dispensing region 118.

Figure 4:
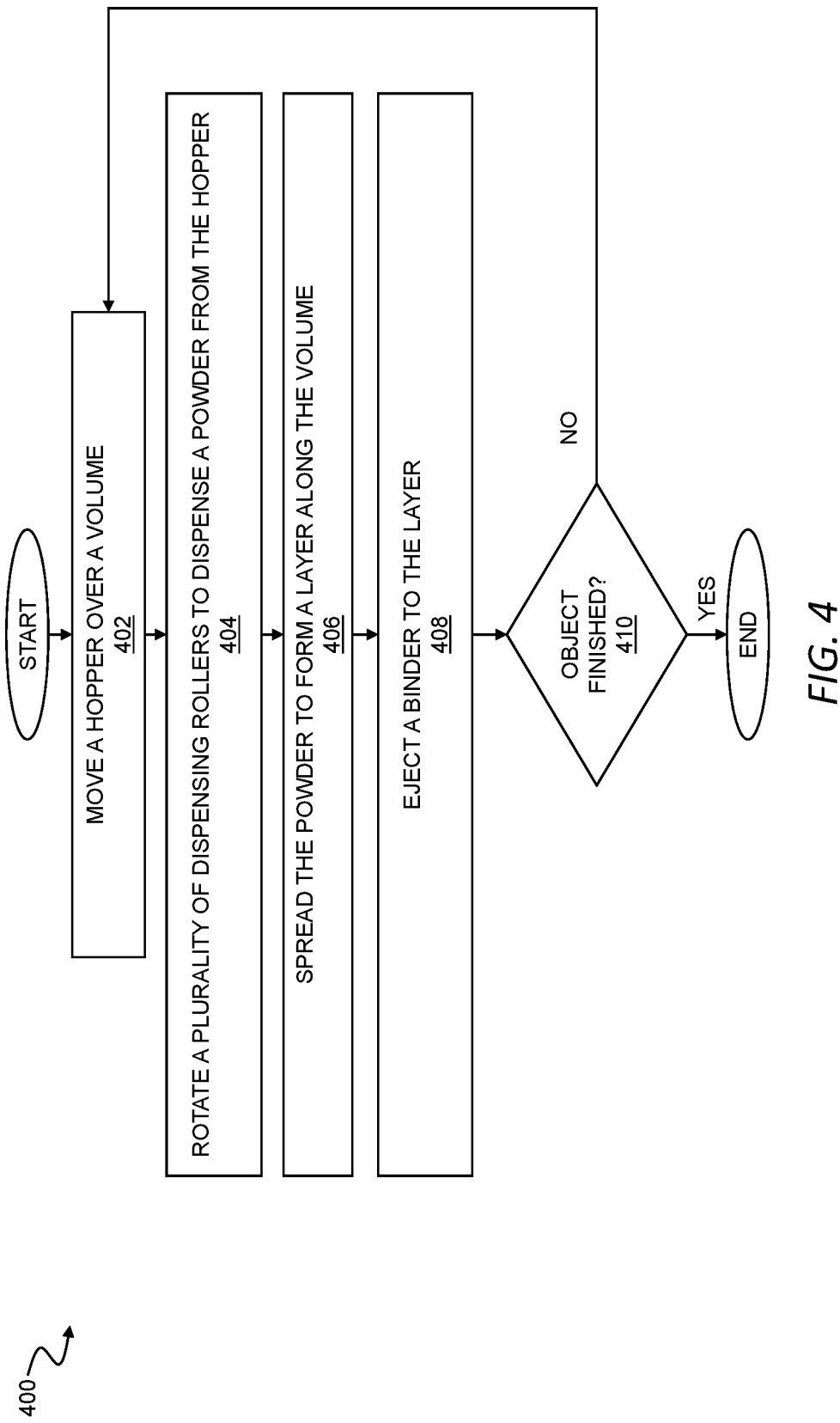
FIG. 4 is a flowchart of an exemplary method of dispensing powder for additive manufacturing.

FIG. 4 is a flowchart of an exemplary method 400 of dispensing powder in additive manufacturing. In general, unless otherwise specified or made clear from the context, the exemplary method 400 may be carried out using any one or more of the additive manufacturing systems described herein. Thus, for example, one or more steps of the exemplary method 400 may be carried out by the additive manufacturing system 100 (FIG. 1A). Additionally, or alternatively, unless otherwise indicated or made clear from the context, the exemplary method 400 may be carried out as part of a single-direction binder fabrication process, a multi-direction binder fabrication process, or a combination thereof.

As shown in step 402, the exemplary method 400 may include moving a hopper over a volume defined by a print box. In general, such movement of the hopper over the volume may include any one or more of the various different techniques for moving a hopper over a volume as described herein. Thus, unless otherwise specified or made clear from the context, moving the hopper over the volume may include any manner and form of moving the hopper 116 (FIG. 1A) over the volume 108 (FIG. 1A).

As shown in step 404, the exemplary method 400 may include, as the hopper moves over the volume, rotating a plurality of dispensing rollers disposed along a dispensing region defined by the hopper. The rotation of the plurality of dispensing rollers may move a powder toward the volume from the dispensing region. In this way, the powder may be distributed along a top of the volume, where the powder may be spread to form a layer.

In general, rotation of the plurality of dispensing rollers may move the powder toward the volume through a gap defined between the plurality of dispensing rollers according to any one or more of various different arrangements described herein. Thus, for example, the gap and the dispensing region may span a dimension of the volume substantially perpendicular to a direction of movement of the hopper over the volume. Additionally, or alternatively, rotating the plurality of dispensing rollers may include counter-rotating dispensing rollers of the plurality of dispensing rollers. In certain instances, rotating the plurality of dispensing rollers may include controlling a rotation speed of at least one of the dispensing rollers of the plurality of dispensing rollers based on a speed of movement of the hopper over the volume. Further, or instead, rotating the plurality of dispensing rollers may include controlling a rotation speed of at least one of the dispensing rollers of the plurality of dispensing rollers based on a position of the hopper over the volume. As a more specific example, controlling the rotation speed of the at least one of the dispensing rollers may include reducing the rotation speed of the at least one of the dispensing rollers as the hopper moves from a first side of the volume to a second side of the volume, the second side opposite the first side. Still further or instead, rotating the plurality of dispensing rollers may include rotating each dispensing roller of the plurality of dispensing rollers at substantially the same rotation speed and, in certain instances, in a counter-rotating fashion. In some implementations, rotating the plurality of dispensing rollers may include controlling a rotation speed of each dispensing roller of the plurality of dispensing rollers based on a direction of movement of the hopper over the volume (e.g., activating rotation in one direction of movement and deactivating rotation in another direction of movement).

As shown in step 406, the exemplary method 400 may include spreading the powder along the volume to form a layer of the powder. As should be appreciated, the uniformity of this layer of the powder may be function of uniformity of distribution of the powder ahead of the spreader in step 404. In general, spreading the powder along the volume may be carried out according to any one or more of the spreading techniques described herein.

As shown in step 408, the exemplary method 400 may include, in a controlled two-dimensional pattern, ejecting a binder from at least one ejection orifice of a print carriage to the layer of the powder to form a portion (e.g., a two-dimensional slice) of the object. The distribution of the binder in this way may be carried out according to any on or more binder distribution techniques described herein.

As shown in step 410, the exemplary method 400 may include repeating one or more of the steps of moving the hopper (step 402), rotating the plurality of dispensing rollers to dispense a powder (step 404), spreading the powder to form a layer along the volume (step 406), and ejecting a binder to the layer in a controlled two-dimensional pattern (step 408) to form the object layer-by-layer.

Powder Packing

Referring again to FIGS. 1A, 1B, and 2, in certain implementations, one or more instances of the spreader 114 associated with the first material carriage 104a and the second material carriage 104b may be actuatable to vibrate at a frequency (e.g., a predetermined frequency) to transmit vibration from the spreader 114 to the powder 120 as the spreader 114 moves across the volume 108. Such transmission of vibration may be useful, for example, for packing the powder 120 in the volume 108 as the spreader 114 spreads the powder 120 to form a layer. In turn, such an improvement in packing of the powder 120 may improve quality of the final part formed from the three-dimensional object 110 (e.g., reducing layer-to-layer variations of the powder 120 and/or improving density characteristics of the three-dimensional object 110 being formed). Thus, as fabrication techniques increase in speed, the transmission of vibration from the spreader 114 to the powder 120 may facilitate maintaining or, in some cases, improving quality of the final parts formed from respective instances of the three-dimensional object 110.

As indicated above, the spreader 114 may include a roller and any of the various different vibration techniques described herein may be applied to implementations of the spreader 114 including the roller. Thus, for the sake of clarity and efficient explanation, the following discussion of vibration of the spreader 114 shall be understood to be applicable to implementations in which the spreader includes a roller. However, unless otherwise specified or made clear from the context, certain aspects of vibration of the spreader 114 shall be understood to be applicable to other shapes.

Returning to the example in which the spreader 114 may be rotatable in a direction counter to a direction of movement of the roller across the volume 108 as the roller moves across the volume 108, the spreader 114 may be actuatable to vibrate as the spreader 114 is rotated in a direction counter to the direction of movement of the spreader 114 such that the vibration of the spreader 114 is superimposed on the counter rotation of the spreader. In general, the spreader 114 may be vibrated at a frequency that does not interfere with the overall counter-rotational movement of the spreader 114. For example, as the spreader 114 is counter rotated, a high frequency rotational vibration may be superimposed on the spreader 114 as the spreader 114 continues to move in a motion that is, overall, a counter-rotating motion.

In general, the additive manufacturing system 100 may include an actuator 150 coupled to the spreader 114. The actuator 150 may impart rotation (e.g., counter rotation) to the actuator and, further or instead, may impart vibration to the spreader 114 according to any one or more of various different techniques. In certain applications, the actuator 150 may vibrate the spreader 114 according to any of various different techniques suitable for imparting to the spreader 114 a vibration having a frequency of greater than about 1 kHz and less than about 1 MHz. As an example, the actuator 150 may include an eccentric motor coupled to the spreader 114 to impart vibration. Additionally, or alternatively, the actuator 150 may include one or more springs coupled to the spreader 114. Continuing with this example, vibration may be imparted to the spreader 114 through force applied to the one or more springs. Further, or instead, the actuator 150 may include a voice coil actuator coupled to the spreader 114 such that actuation of the voice coil actuator may transmit vibration to the spreader 114 at a predetermined frequency. In certain instances, the spreader 114 may include a piezoelectric coating in electrical communication with the actuator 150, and the actuator 150 may pulse the piezoelectric coating to impart vibration to the spreader 114. Further, or instead, the spreader 114 may include a wall defining a roller volume, and the actuator 150 may include a pump in fluid communication with a source of a fluid (e.g., a gas such as air or a liquid such as water) and the roller volume of the spreader 114. In use, the pump may be actuated to provide pressurized pulses of the fluid to the roller volume of the spreader 114. In response to such pressurized pulses, the wall of the spreader 114 may flex at the frequency of the pulses.

Figure 5:
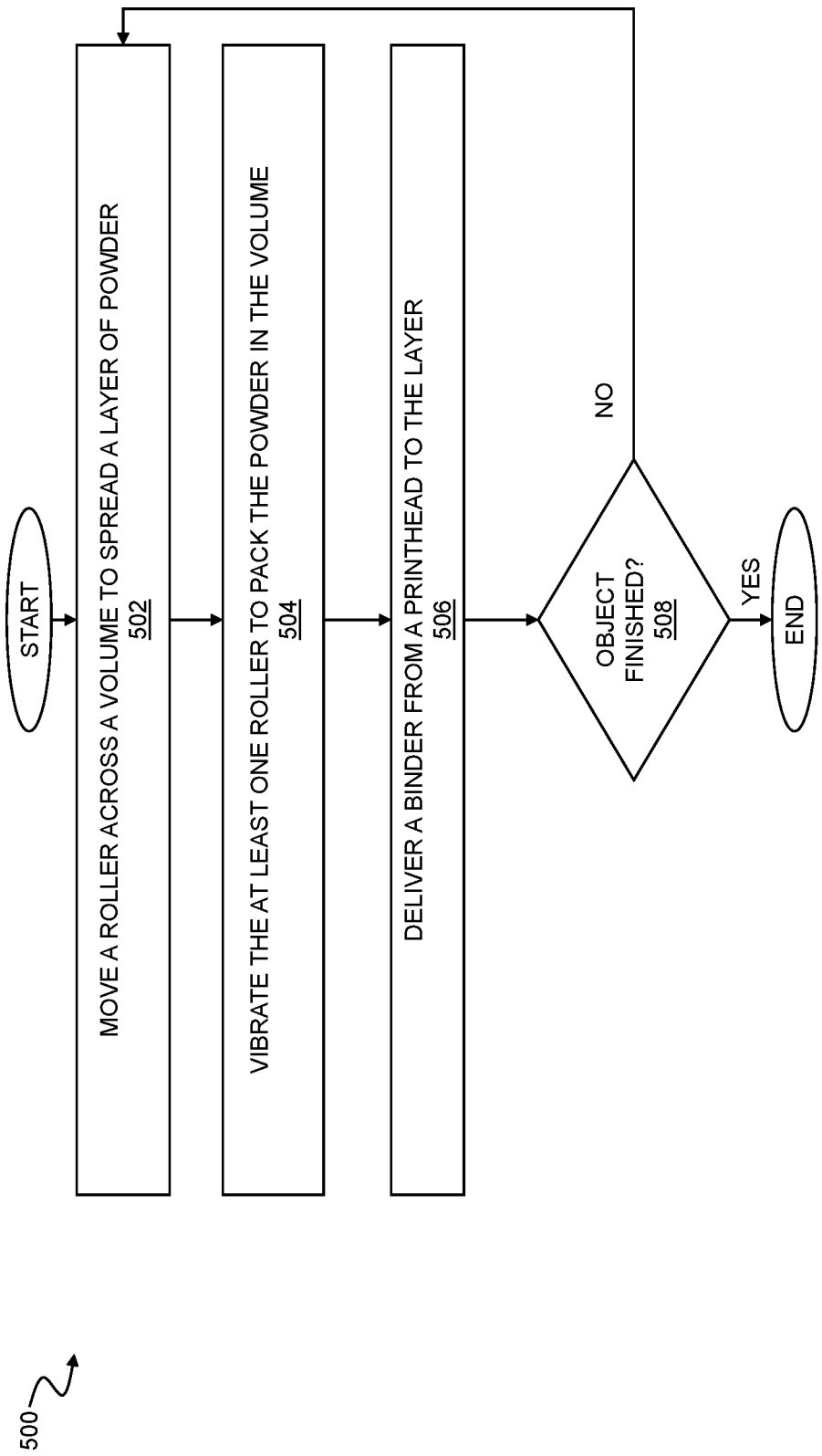
FIG. 5 is a flowchart of an exemplary method of packing powder for additive manufacturing.

FIG. 5 is a flowchart of an exemplary method 500 of packing powder for additive manufacturing. In general, unless otherwise specified or made clear from the context, the exemplary method 500 may be carried out using any one or more of the additive manufacturing systems described herein. Thus, for example, one or more steps of the exemplary method 500 may be carried out by the additive manufacturing system 100 (FIG. 1A). Additionally, or alternatively, unless otherwise indicated or made clear from the context, the exemplary method 500 may be carried out as part of a single-direction binder fabrication process, a multi-direction binder fabrication process, or a combination thereof.

As shown in step 502, the exemplary method 500 may include moving at least one roller across a volume defined by a powder box, with the movement of the at least one roller across the volume spreading a layer of a powder across the volume. In general, the layer of the powder may be spreader across the entire volume as the at least one roller moves across the volume. As an example, the at least one roller may include the spreader 114 (FIG. 1A) implemented as a roller as described herein. As a specific example, moving the at least one roller across the volume may include rotating the at least one roller in a direction counter to the direction of movement of the at least one roller, which may be useful for facilitating spreading the powder. Additionally, or alternatively, moving the at least one roller across the volume may include moving the at least one roller at a predetermined frequency across the volume defined by the powder box.

As shown in step 504, the exemplary method 500 may include, as the at least one roller spreads the layer of the volume, vibrating the at least one roller to pack the powder in the volume. The vibration may be imparted to the at least one roller in any one or more of various different directions, as may be useful for achieving suitable packing characteristics of the powder. Thus, returning to the example of the counter-rotating roller, vibrating the at least one roller may include superimposing rotational vibration of the at least one roller onto the rotation of the at least one roller, as described herein. Further, or instead, vibrating the at least one roller may include vibrating the at least one roller in a direction substantially perpendicular to a direction of movement of the at least one roller across the volume.

In general, vibrating the at least one roller may include imparting vibration to the roller according to any one or more of the various different techniques described herein. Thus, for example, vibrating the at least one roller may include any one or more of the following techniques: delivering spring force to the at least one roller via one or more springs coupled to the at least one roller; controlling an eccentric motor to a predetermined rotation speed as the eccentric motor is mechanically coupled to the at least one roller; actuating a voice coil actuator at a predetermined frequency as the voice coil actuator is mechanically coupled to the at least one roller; delivering pulsed pneumatic force to a hollow volume of the at least one roller; electrically actuating a piezoelectric coating on the at least one roller. Additionally, or alternatively, vibrating the at least one roller may include vibrating the at least one roller at a frequency of greater than about 1 kHz and less than about 1 MHz.

In certain implementations, the frequency of vibration of the at least one roller may be based on one or more characteristics of the powder. Such characteristics may include, for example, size distribution and/or composition of the powder. For example, vibrating the at least one roller may include vibrating the at least one roller at a predetermined frequency corresponding to a wavelength substantially equal to an average size of particles of the powder as the at least one roller moves across the powder box at the predetermined velocity.

As shown in step 506, the exemplary method 500 may include delivering a binder from the print carriage to the layer of the powder in a predetermined two-dimensional pattern associated with the layer as the print carriage moves over the volume. Delivering the binder from the print carriage in this way may include any manner and form of delivery of the binder 112 (FIG. 1A) described herein.

As shown in step 508, the exemplary method 500 may include, for each layer of a plurality of layers, repeating one or more of the steps of moving the at least one roller across the volume (step 502), vibrating the at least one roller (step 504), and delivering the binder (step 506) from the print carriage to the respective layer in a predetermined two-dimensional pattern associated with the respective layer to form a three-dimensional object. Unless otherwise specified or made clear from the context, it should be generally understood that one or more of the steps of the exemplary method 500 may be carried out as part of a single-direction fabrication process or a multi-direction fabrication process. Thus, for example, the steps of moving the at least one roller across the volume (step 502), vibrating the at least one roller (step 504), and delivering the binder from the print carriage (step 506) to the respective layer may be carried out in a first direction across the volume and in a second direction across the volume, with the second direction being different from the first direction.

While certain implementations have been described, other implementations are additionally or alternatively possible.

For example, while additive manufacturing systems have been described as delivering a powder, it should be generally understood that the powder may have any of various different compositions useful for forming the three-dimensional object into a dense part having a desired composition. Thus, for example, the powder in a given hopper may include any one or more of various different materials that may be usefully combined to form a dense part. As a more specific example, the powder may include any one or more of various different metals alloyable or otherwise combinable with one another according to a predetermined material specification.

As another example, while additive manufacturing systems have been described as delivering the same powder from multiple hoppers, it should be appreciated that such description has been for the sake of clarity of explanation. More generally, each hopper may be associated with a unique powder. That is, in certain instances, a first powder in a first hopper may have a first size distribution, and a second powder in a second hopper may have a second size distribution, different from the first size distribution. Further, or instead, a first powder in a first hopper may have a first composition (e.g., different types of particles, different concentrations of particles, and combinations thereof), and a second powder in a second hopper may have a second composition, different from the first composition.

For example, referring again to FIG. 3, the exemplary method 300 may be carried out using a first powder and a second powder. This may be useful, for example, for forming a three-dimensional object with alternating layers having corresponding alternating compositions. That is, with respect to step 302, in the first direction, spreading the layer of powder may include dispensing a first powder from a first hopper and, in the second direction, spreading the layer of the powder may include dispensing a second powder from a second hopper. The first powder may include, for example, metal particles of a first metal, and the second powder may include, for example, metal particles of a second metal, different from the first metal.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An additive manufacturing system comprising:
   a print box defining a volume;
   a print carriage movable over the volume, the print carriage defining at least one ejection orifice directed toward the volume as the print carriage moves over the volume;
   a spreader movable over the volume in advance of the print carriage; and
   a hopper movable over the volume in advance of the spreader, the hopper defining a dispensing region, the hopper including a plurality of dispensing rollers along the dispensing region, and the plurality of dispensing rollers counter-rotatable relative to one another to meter a powder through a gap between the dispensing rollers and toward the volume in advance of the spreader as the spreader moves toward a position over the volume to form a layer of the powder, onto which a binder is deliverable from the at least one ejection orifice of the print carriage trailing the spreader over the volume.

2. The system of claim 1, wherein the dispensing region of the hopper spans a dimension of the volume substantially parallel to the gap as the hopper moves over the volume.

3. The system of claim 2, wherein the plurality of dispensing rollers span the dimension of the volume as the hopper moves over the volume.

4. The system of claim 1, wherein each dispensing roller of the plurality of dispensing rollers has a substantially similar diameter.

5. The system of claim 1, further comprising at least one motor mechanically coupled to one or more dispensing rollers of the plurality of dispensing rollers, the at least one motor actuatable to rotate the plurality of dispensing rollers relative to one another.

6. The system of claim 5, wherein the at least one motor is actuatable to rotate the plurality of dispensing rollers in a counter-rotating direction relative to one another.

7. The system of claim 5, further comprising a controller in electrical communication with the at least one motor, the controller configured to actuate the at least one motor based on movement of the hopper over the volume.

8. The system of claim 7, wherein the controller is configured to actuate the at least one motor in a first direction of movement of the hopper over the volume and to pause actuation of the at least one motor in a second direction of movement of the hopper over the volume, the second direction of movement different from the first direction of movement.

9. The system of claim 7, wherein the controller is configured to actuate the at least one motor based on speed of movement of the hopper over the volume.

10. The system of claim 7, wherein the controller is configured to actuate the at least one motor to rotate the plurality of dispensing rollers at substantially the same rotation speed.

11. The system of claim 5, wherein the hopper includes a storage region in fluid communication with the dispensing region, the powder movable from the storage region toward the dispensing region through force of gravity as the hopper moves over the volume.

12. The system of claim 5, wherein the hopper includes a shutter selectively movable between a first position away from the dispensing region to a second position below the dispensing region to interrupt movement of powder exiting the hopper via the dispensing region.

13. The system of claim 12, wherein the shutter is selectively movable between the first position and the second position based on rotation of dispensing rollers of the plurality of dispensing rollers.

* * * * *